United States Patent [19]

Tsujimura et al.

[11] Patent Number: 5,017,055

[45] Date of Patent: *May 21, 1991

[54] INDEXABLE CUTTER INSERT

[75] Inventors: Osamu Tsujimura, Kawasaki; Tatsuo Arai, Kitamoto; Masaaki Nakayama, Tokyo; Masayuki Okawa, Kawasaki, all of Japan

[73] Assignee: Mitsubishi Kinzoku Kabushiki Kaisha, Tokyo, Japan

[*] Notice: The portion of the term of this patent subsequent to Jun. 19, 2007 has been disclaimed.

[21] Appl. No.: 430,928

[22] Filed: Nov. 2, 1989

Related U.S. Application Data

[63] Continuation of Ser. No. 164,441, Mar. 4, 1988, abandoned.

[30] Foreign Application Priority Data

| Mar. 4, 1987 [JP] | Japan | 62-31257[U] |
| Sep. 16, 1987 [JP] | Japan | 62-141236[U] |
| Sep. 25, 1987 [JP] | Japan | 62-146266[U] |
| Oct. 16, 1987 [JP] | Japan | 62-158600[U] |
| Nov. 26, 1987 [JP] | Japan | 62-179931[U] |

[51] Int. Cl.$^5$ ............................. B23C 5/10; B23C 5/14
[52] U.S. Cl. .......................................... 407/113; 407/42
[58] Field of Search ................. 407/42, 54, 65, 113, 407/114

[56] References Cited

U.S. PATENT DOCUMENTS

| 4,072,438 | 2/1978 | Powers | 407/42 |
| 4,132,493 | 1/1979 | Hosoi . | |
| 4,280,774 | 7/1981 | Hayama | 407/42 |
| 4,411,564 | 10/1983 | Johnson | 407/113 |
| 4,512,689 | 4/1985 | Bylund | 407/40 |
| 4,525,110 | 6/1985 | Stojanovski | 407/40 |
| 4,527,930 | 7/1985 | Harroun | 407/42 |
| 4,566,827 | 1/1986 | Neumueller | 407/42 |
| 4,588,331 | 5/1986 | Yoshinori | 407/42 |
| 4,618,296 | 10/1986 | Allaire et al. | 407/42 |
| 4,679,968 | 7/1987 | Tsujimura et al. | 407/114 |
| 4,693,641 | 9/1987 | Tsujimura et al. | 407/42 |
| 4,712,949 | 12/1987 | Johnson | 407/42 |
| 4,714,383 | 12/1987 | Shimomura et al. | 407/42 |

FOREIGN PATENT DOCUMENTS

| 2259108 | 6/1973 | Denmark . | |
| 160850 | 6/1990 | European Pat. Off. . | |
| 2224529 | 9/1982 | Fed. Rep. of Germany . | |
| 59-15766 | 4/1984 | Japan . | |
| 59-21724 | 5/1984 | Japan . | |
| 59-21725 | 5/1984 | Japan . | |
| 214501 | 12/1984 | Japan | 407/113 |
| 134812 | 8/1986 | Japan | 407/42 |
| 63-57114 | 3/1988 | Japan . | |

Primary Examiner—William E. Terrell
Attorney, Agent, or Firm—Cushman, Darby & Cushman

[57] ABSTRACT

An indexable cutter insert for a rotary cutter includes a plate having front and rear faces. The front face has at least one pair of first and second marginal ridges intersecting each other. The first marginal ridge is generally arcuately shaped when viewed in a direction perpendicular to the front face and serves as a main cutting edge. The second marginal ridge is short and straight and serves as a second cutting edge. The main cutting edge has a leading end portion intersecting the second cutting edge so as to define an obtuse angle therebetween. The front face serves as a rake surface for the main and second cutting edges and has a marginal surface portion disposed adjacent to the second cutting edge and the leading end portion of the main cutting edge. The marginal surface portion is convexly curved so as to slope toward the rear face toward the second cutting edge.

2 Claims, 9 Drawing Sheets

INDEXABLE CUTTER INSERT

This is a continuation of application Ser. No. 07/164,441, filed Mar. 4, 1988 which was abandoned upon the filing hereof now abandoned.

BACKGROUND OF THE INVENTION

1. Field of the Invention

The present invention pertains to indexable cutter inserts for a rotary cutter such as a ball end mill and a drill bit.

2. Prior Art

Figure 1:
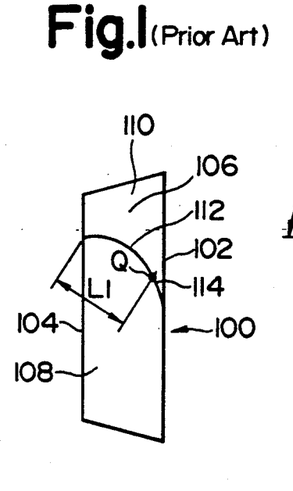
FIG. 1 a side elevation of a conventional cutter insert.
Figure 2:
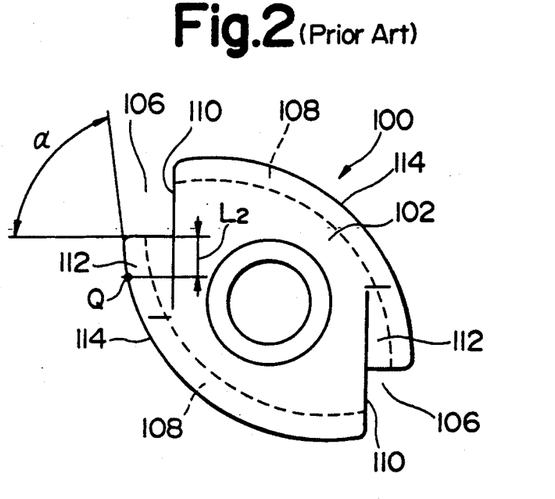
FIG. 2 is a plan view of the insert of FIG. 1.

FIGS. 1 and 2 show one conventional cutter insert as disclosed in Published Examined Japanese Patent Application No. 59-21725. The insert 100 comprises a plate-like body defined by a front face 102, a rear face 104 and a side periphery lying between the front and rear faces 102 and 104. A pair of opposite notches 106 of a generally V-shape are formed in the side periphery to interrupt the side periphery to provide a pair of opposite side faces 108. Each of the V-shaped notches 106 extends from the front face 102 to the rear face 104 and is defined by a pair of first and second opposed walls 110 and 112. The first wall 110 is flat and perpendicular to the front face 102 while the second wall 112 is convexly curved when viewed in a direction perpendicular to the first wall 110. Each of the side faces 108 assumes a generally quadrantlike shape when viewed in a direction perpendicular to the front face 102, and cooperates with the front face 102 and the second wall 112 of the notch 106 to define a cutting edge 114 which is convexly arcuate as viewed in the same direction. A marginal surface portion of the front face 102 and the second wall 112 disposed adjacent to and extending along each cutting edge 114 serves as a rake surface.

Figure 3:
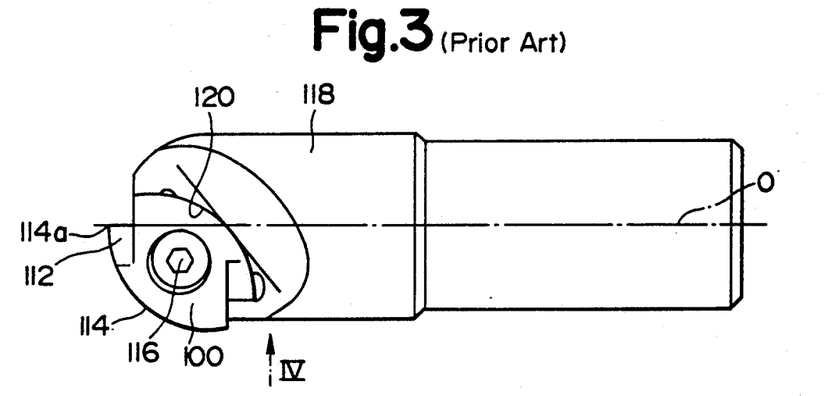
FIG. 3 is a front elevation of a ball end mill employing the insert of FIG. 1.
Figure 4:
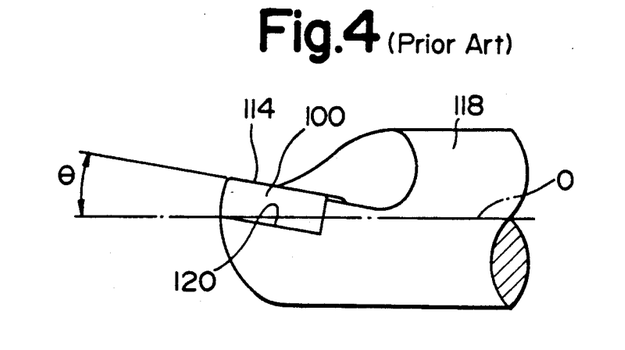
FIG. 4 is a side elevation of a part of the end mill of FIG. 3, as seen in the direction indicated by the arrow IV in FIG. 3.
Figure 5:
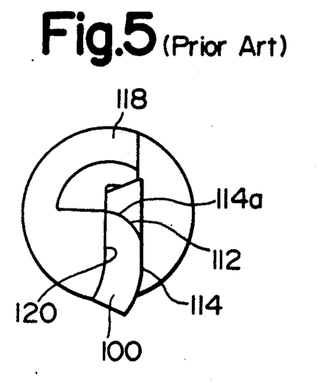
FIG. 5 is an end view of the end mill of FIG. 3.

As shown in FIGS. 3 to 5, the insert 100 is removably secured by a clamp screw 116 to a body 118 of the ball end mill with the rear face 104 mated with a recessed seat surface 120, in such a manner that an indexed one of the cutting edges 114 is disposed so as to extend outwardly beyond the front end and outer periphery of the end mill body 118, and that the leading end portion 114a of the indexed cutting edge 114 disposed adjacent to an axis O of the end mill body 118 is convexly curved when viewed axially of the end mill body 118. Besides, the axial rake angle $\theta$ for the indexed cutting edge 114 is rendered positive.

In the cutter insert described above, the leading end portion 114a of the indexed cutting edge 114 begins to engage a workpiece first, and then other portions of the cutting edge 114 begin to engage the workpiece as the end mill body 118 rotates. Accordingly, the cutting load increases gradually as the cutting operation proceeds, and a great load will not be exerted on the indexed cutting edge 114 at a time, so that the cutting edge 114 is less liable to damage.

In such a prior art insert, however, an angle $\alpha$ defined by a leading end of the second wall 112 and a straight line tangent to the cutting edge 114 at its leading end is less than 90°, and hence the strength of the cutting edge 114 is not sufficiently high at its leading end. In addition, the flat wall 110 of the V-shaped notch 106 prevents a smooth discharge of chips during the cutting operation and causes the jamming of chips, so that the cutting edge 114 is liable to damage.

SUMMARY OF THE INVENTION

It is therefore an object of the present invention to provide an indexable cutter insert in which the cutting edge is less susceptible to damage even at its leading end, and in which a smooth discharge of chips is positively ensured.

According to the present invention, there is provided an indexable cutter insert for a rotary cutter comprising a plate having front and rear faces, the front face having at least one pair of first and second marginal ridges intersecting each other, the first marginal ridge being generally arcuately shaped when viewed in a direction perpendicular to the front face and serving as a main cutting edge while the second marginal ridge is short and generally straight and serves as a second cutting edge, the main cutting edge having a leading end portion intersecting the second cutting edge so as to define an obtuse angle therebetween, the front face serving as a rake surface for the main and second cutting edges and having a marginal surface portion disposed adjacent to the second cutting edge and the leading end portion of the main cutting edge, the marginal surface portion being convexly curved so as to slope toward the rear face toward the second cutting edge.

BRIEF DESCRIPTION OF THE DRAWINGS

FIG. 21 is a plan view of a cutter insert in accordance with a fifth embodiment of the present invention;

FIG. 22 is a side elevation of the cutter insert of FIG. 21 as seen in the direction indicated by the arrow XXII in FIG. 21;

FIG. 12 is a side elevation of the insert of FIG. 21 as seen in the direction indicated by the arrow XXIII in FIG. 21;

FIG. 24 is a side elevation of the cutter insert of FIG. 21 as seen in the direction indicated by the arrow XXIV in FIG. 21;

DESCRIPTION OF THE PREFERRED EMBODIMENTS OF THE INVENTION

Various embodiments of the present invention will now be described with reference to FIGS. 6 to 42 of the accompanying drawings in which the same reference characters are used to designate like parts or elements in several views.

Figure 6:
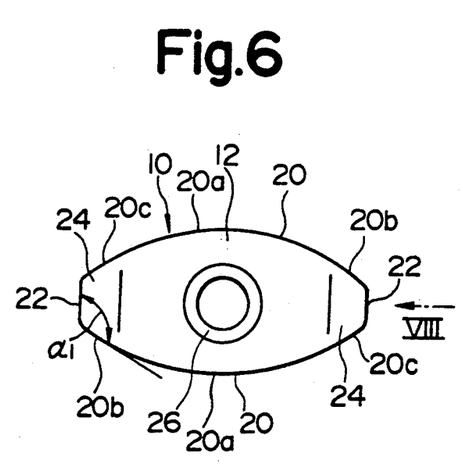
FIG. 6 is a plan view of a cutter insert in accordance with a first embodiment of the present invention.
Figure 7:
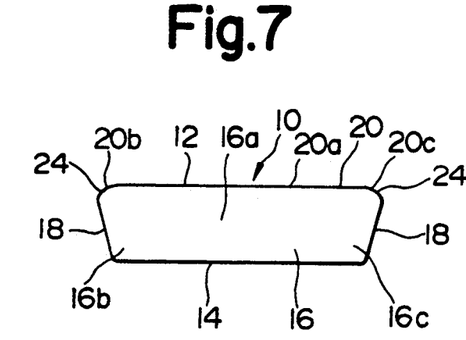
FIG. 7 is a side elevation of the cutter insert of FIG. 6.
Figure 8:
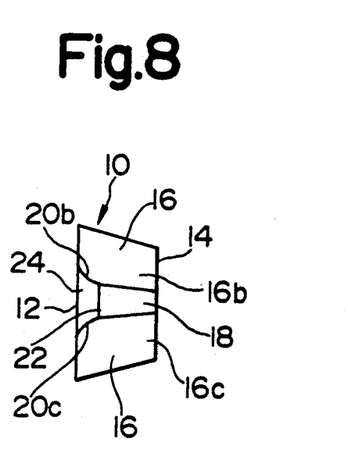
FIG. 8 is another side elevation of the insert of FIG. 6, as seen in the direction indicated by the arrow VIII in FIG. 6.

Referring to FIGS. 6 to 8, an indexable cutter insert 10 in accordance with a first embodiment of the present invention comprises a generally elliptically shaped plate of a hard material such as cemented carbide defined by a front face 12, a rear face 14 disposed parallel to the front face 12, and two pairs of first and second side faces 16 and 18 disposed alternately and lying between the front and rear faces 12 and 14, each side face being sloping inwardly of the plate in a direction away from the front face 12. The two first side faces 16 are symmetrical with respect to a median plane of the plate or insert extending longitudinally thereof, and the two second side faces 18 are symmetrical with respect to a median plane extending transversely thereof. Each first side face 16 is convexly curved so as to assume a quadrant-like shape as viewed in a direction perpendicular to the front face 12, and comprised of a central arcuate portion 16a and a pair of leading and trailing planar portions 16b and 16c disposed at opposite ends of the central portion 16a so as to be tangential to the central portion 16a at the opposite ends, respectively. Each second side face 18 is planar and short as compared with the first side face 16. Each first side face and each second side face intersects each other in such a manner that an angle defined by the second side face and the planar portion 16b, 16c of the first side face 16 is obtuse. The insert has a pair of convexly curved main cutting edges 20 each defined by the intersection of a respective one of the first side faces 16 with the front face 12, and a pair of second cutting edges 22 each defined by the intersection of a respective one of the second side faces 18 with the front face 12. Each main cutting edge 20 has a leading end where it intersects one of the second cutting edges 22 and also has a trailing end where it intersects the other second cutting edge 22, and is comprised of a central cutting edge portion 20a and leading and trailing end portions 20b and 20c defined by the marginal ridges of the leading and trailing portions 16b and 16c. And, as shown in FIG. 6, an angle $\alpha_1$ defined by the second cutting edge 22 and a straight line tangent to the main cutting edge 20 at its leading end is obtuse.

The front face 12 serves as a rake surface for the cutting edges 20 and 22, and a marginal surface portion 24 of the front face 12 disposed adjacent to each second cutting edge 22 and the leading and trailing end portions 20b and 20c intersecting the second cutting edge 22 is convexly curved in such a manner as to slope toward the rear face 14 toward the second cutting edge 22, whereby the leading and trailing end portions 20b and 20c of each main cutting edge 20 are convexly arcuate as viewed in a side elevation. The leading and trailing end portions 20b and 20c are also convexly curved as viewed in a direction perpendicular to the front face 12 since the first side face 16 is sloping inwardly of the plate in a direction away from the front face 12. The insert plate has a central aperture 26 formed therethrough.

Figure 9:
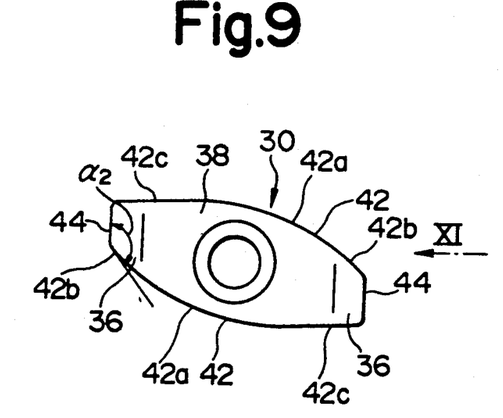
FIG. 9 is a plan view of a cutter insert in accordance with a second embodiment of the present invention.
Figure 10:
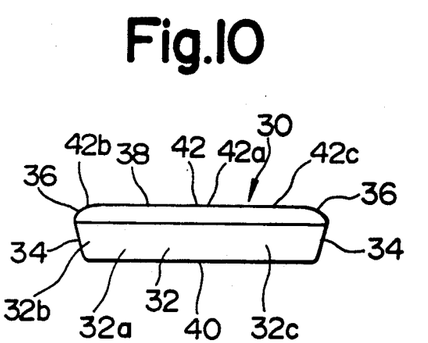
FIG. 10 is a side elevation of the cutter insert of FIG. 6.
Figure 11:
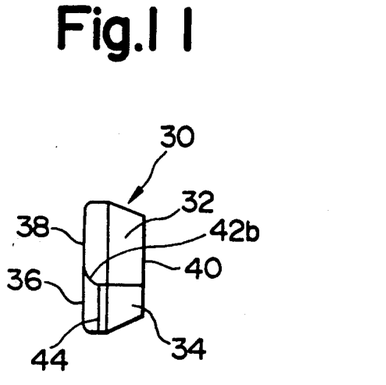
FIG. 11 is another side elevation of the insert of FIG. 9, as seen in the direction indicated by the arrow XI in FIG. 9.

FIGS. 9 to 11 show a modified indexable cutter insert 30 in accordance with a second embodiment of the present invention which is generally similar in construction to the above-mentioned insert 10. In this insert 30, however, two opposing first side faces 32 as well as two opposing second side faces 34 are not symmetrical with respect to the median plane but symmetrical only with respect to an axis of the plate or the insert. Central and leading portions 32a and 32b of the first side face 32 are defined by an arcuately curved surface while a trailing portion 32c thereof is planar and extends from the central portion 32a so as to be tangential thereto at its end. The leading portion 32b intersects one of the second side faces 34 so as to define an obtuse angle therebetween while the trailing portion 32c intersects the other second side face 34 so as to define a generally right angle therebetween. In addition, each side face 32, 34 is defined by an upper portion disposed adjacent to the front face 38 and extending generally perpendicular to the front face 38 and a lower portion sloping inwardly of the insert in a direction away from the front face 38. And, a marginal surface portion 36 of the front face 38 disposed adjacent to each second side face 34 and leading and trailing portions 32b and 32c intersecting the second side face 34 is convexly curved in such a manner as to slope toward a rear face 40 toward the second side face 34. Thus, each main cutting edge 42 is comprised of a central cutting edge portion 42a and leading end portion 42b which are generally arcuately shaped when viewed in a plan, and a trailing end portion 42c which is straight when viewed in a plan, the leading end portion 42b intersecting one of second cutting edges 44 so as to define an obtuse angle $\alpha_2$ therebetween while the trailing end portion 42c intersects the other second cutting edge 44 so as to define a generally right angle therebetween.

Figure 12:
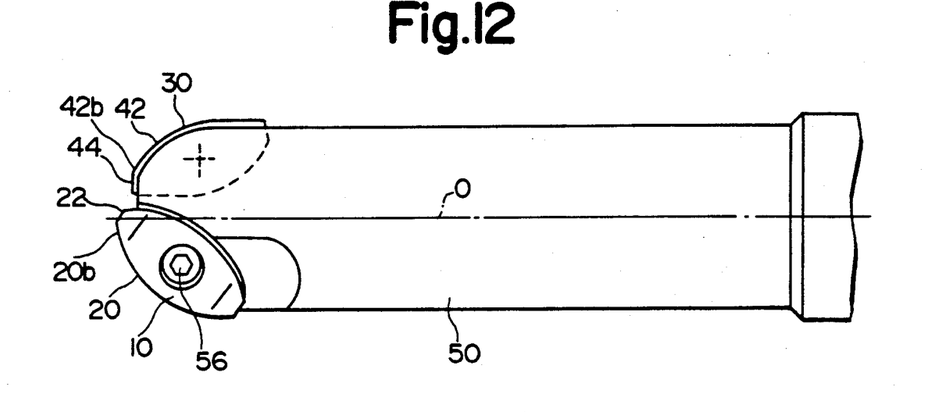
FIG. 12 is a front elevation of a ball end mill employing the inserts of the first and second embodiments.
Figure 13:
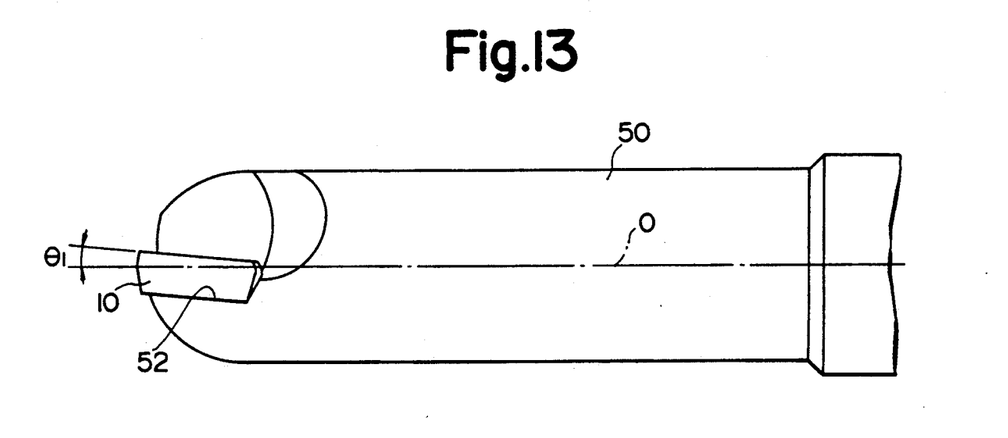
FIG. 13 is a side elevation of the ball end mill of FIG. 12.
Figure 14:
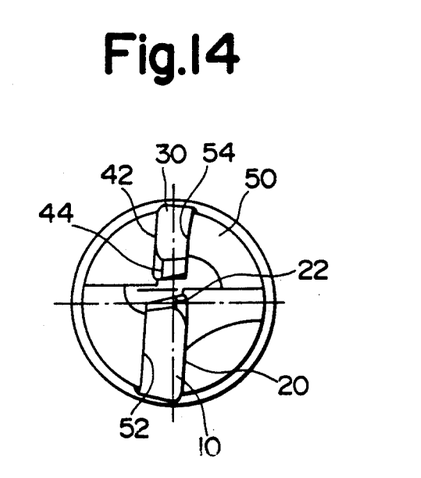
FIG. 14 is an end view of the end mill of FIG. 12.
Figure 15:
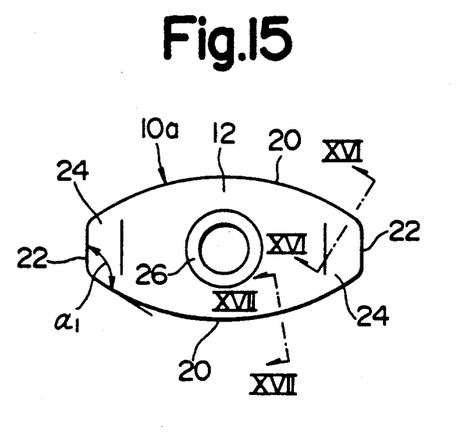
FIG. 15 is a plan view of a cutter insert in accordance with a third embodiment of the present invention.
Figure 16:
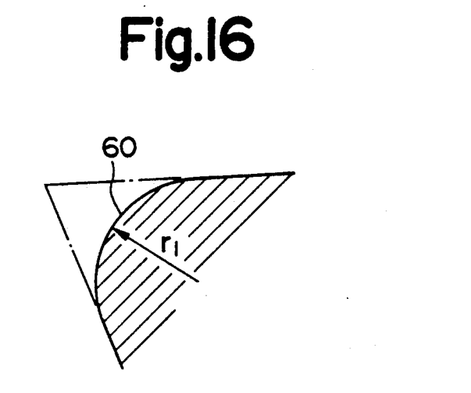
FIG. 16 is a cross sectional view taken along the line XVI—XVI in FIG. 15.
Figure 17:
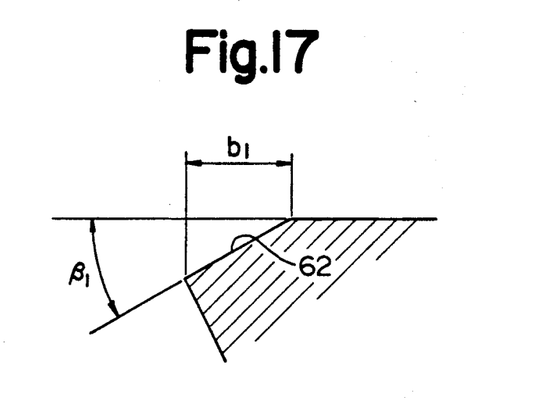
FIG. 17 is a cross sectional view taken along the line XVII—XVII in FIG. 15.
Figure 18:
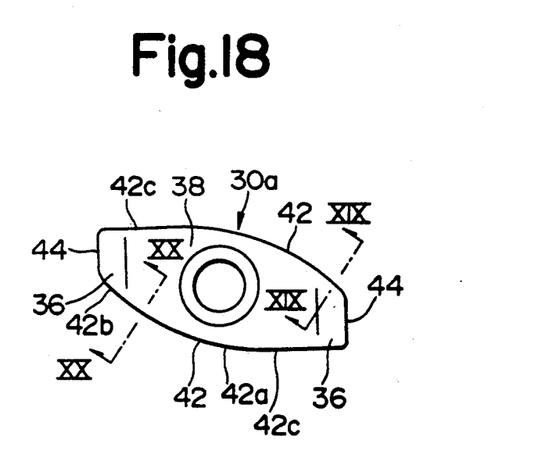
FIG. 18 is a plan view of a cutter insert in accordance with a fourth embodiment of the present invention.
Figure 19:
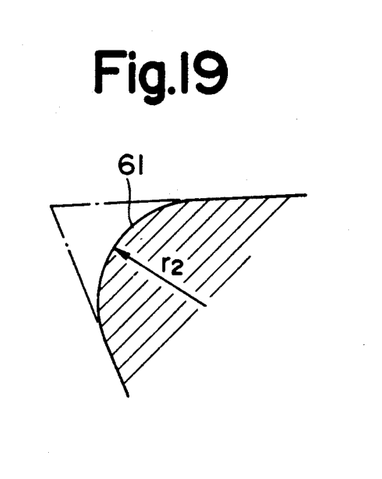
FIG. 19 is a cross sectional view taken along the line XIX—XIX in FIG. 18.
Figure 20:
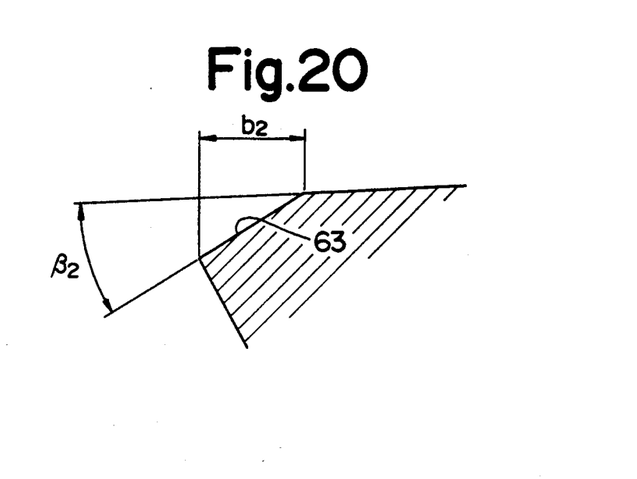
FIG. 20 is a cross sectional view taken along the line XX—XX in FIG. 18.

The cutter inserts 10 and 30 of the first and second embodiments may be employed for a single ball end mill. FIGS. 12 to 14 show such a ball end mill which includes an end mill body 50 having a pair of diagonally opposed recesses 52 and 54 formed in a generally hemispherical forward end portion thereof, the recess 52 being disposed adjacent to the axis O of the body 50 while the recess 54 is spaced radially outwardly from the axis O of the body 50. Each insert 10, 30 is received in a respective one of the recesses 52 and 54 and releasably secured thereto by a clamp screw 56, with the rear face 14, 40 mated with a flat bottom surface of the recess 52, 54, in such a manner that one of the main cutting edges 20, 42 is indexed in a working position so as to extend along the forward end portion of the body 50, and that an axial rake angle $\theta_1$ for the indexed cutting edge 20, 42 is rendered positive. As best shown in FIG. 12, with respect to the insert 10, the leading end portion 20b of the indexed main cutting edge 20 is disposed adjacent to the axis O of the body 50, and the second cutting edge 22 intersecting the indexed main cutting edge 20 at its leading end is disposed so as to extend beyond the axis O of the body 50 toward the rearward end portion of the body 50. On the other hand, with respect to the insert 30, the leading end portion 42b of the indexed main cutting edge 42 is spaced radially outwardly of the body 50 from the axis O of the body 50. Further, the insert 10 is placed in position by bringing prescribed planar leading and trailing portions 16b and 16c into abutment with flat portions formed on the wall surface of the recess 52, respectively, while the insert 30 is placed in position by bringing one planar trailing portion 32c of the first side face 32b and one second side face 34 into abutment with flat portions formed on the wall surface of the recess 54, respectively.

In each of the cutter inserts described above, since the leading end portion 20b, 42b of the main cutting edge 20, 42 is convexly curved as viewed axially of the end mill body 50, the cutting load increases gradually as the cutting operation proceeds, and therefore a great cutting load will not be exerted on the cutting edge 20, 42 at a time. Besides, each insert 10, 30 does not include a wall like the flat wall 110 in the prior art insert 100, and accordingly each of the inserts has a better chip-disposal ability in comparison with the prior art insert 100. Further, since the angle $\alpha_1$, $\alpha_2$ defined by the second cutting edge 22, 44 and the line tangent to the main cutting edge 20, 42 at its leading end is obtuse, the indexed cutting edge 20, 42 has an increased strength even at its leading end.

FIGS. 15 to 17 and FIGS. 18 to 20 show further modified cutter inserts 10a and 30a in accordance with third and fourth embodiments of the present invention, respectively, which are basically similar in construction to the above-mentioned inserts 10 and 30, respectively.

In these embodiments, however, each of the leading and trailing end portions 20b and 20c, 42b and 42c of the main cutting edge 20, 42 is rounded off as at 60, 61 with a radius $r_1$, $r_2$ of about 0.05 mm while the arcuate central cutting edge portion 20a, 42a of each main cutting edge 20, 42 is chamfered as at 62, 63 with a chamfering width $b_1$, $b_2$ of about 0.12 mm and a chamfering angle $\beta_1$, $\beta_2$ of about 25°. With this construction, the strength of each cutting edge 20, 42 is further enhanced, so that each insert 10a, 30a is less susceptible to chipping. In the foregoing, since the leading and trailing end portions of the main cutting edge 20, 42 have a great included angle due to the provision of the convexly curved marginal surface portions, the round-type honing will be enough for such end portions to obtain a sufficient strength, so that the insert can be manufactured easily at a reduced cost. Further, in the foregoing, the honing radius, angle and width would be modified depending upon the materials of workpieces to be processed. For processing a workpiece of steel, however, the round-type horning radius should preferably range from 0.02 mm to 0.06 mm, and the chamfering angle and width should preferably range from 15° to 30° and from 0.07 mm to 0.15 mm, respectively.

Figures 21, 22, 23, 24:
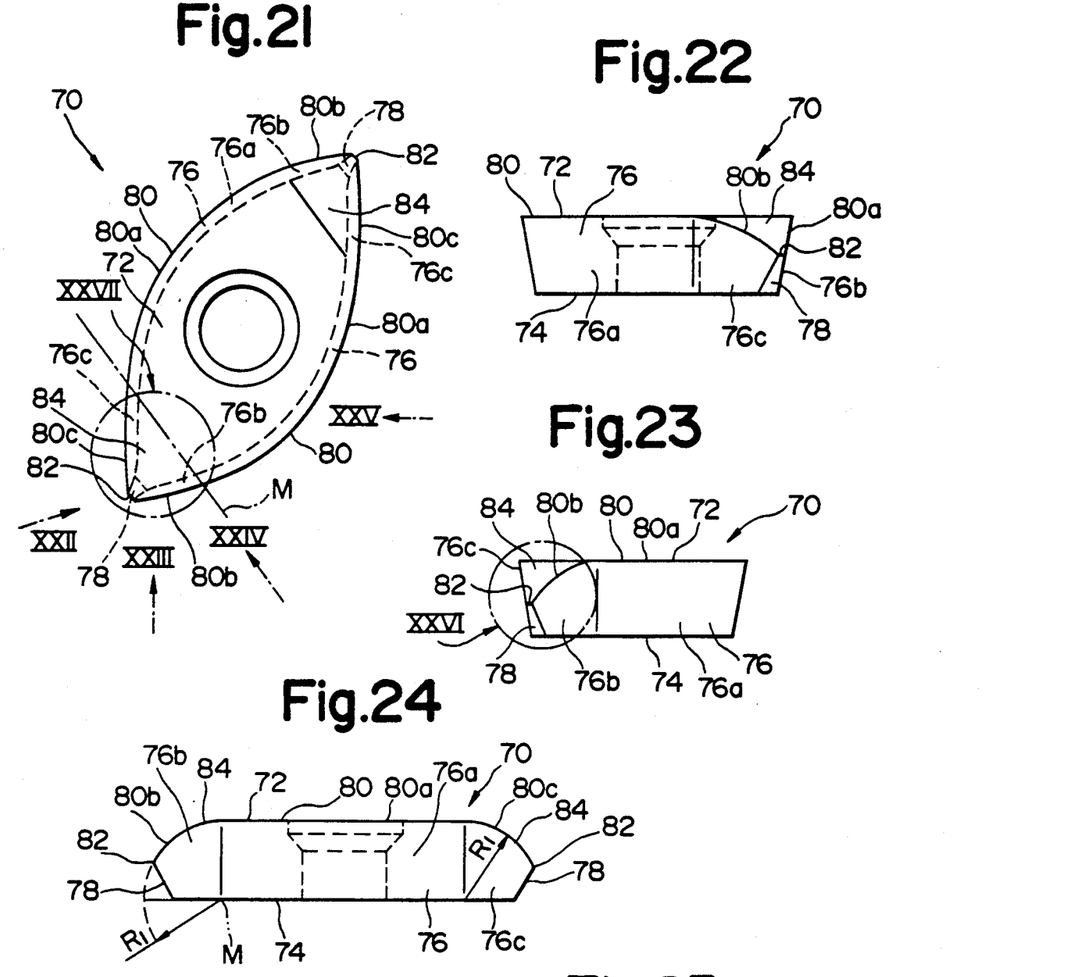
Figure 25:
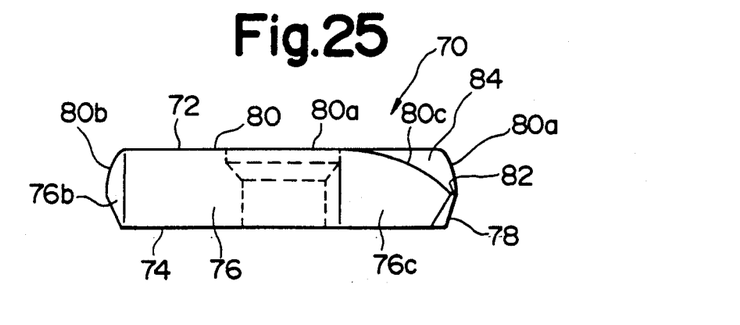
FIG. 25 is a side elevation of the cutter insert of FIG. 21 as seen in the direction indicated by the arrow XXV in FIG. 21.
Figure 26:
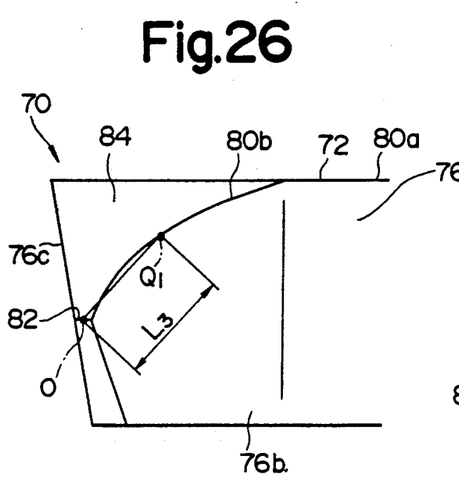
FIG. 26 is an enlarged view of a portion encircled by the character XXVI in FIG. 23.

FIGS. 21 to 27 show a further modified cutter insert 70 in accordance with a fifth embodiment of the present invention. As are the cases with the above-mentioned inserts, the insert 70 comprises a generally elliptical plate defined by a front face 72, a rear face 74, and two pairs of first and second side faces 76 and 78 disposed alternately. The two first side faces 76 as well as the two second side faces 78 are symmetrical with each other about the axis of the plate, and each second side face 78 is of a trapezoidal shape and is very short as compared with each first side face 76. Each first side face 76 is comprised of an arcuate central portion 76a, a planar leading portions 76b and a planar trailing portion 76c longer than the leading portion. The insert 70 includes a pair of convexly curved main cutting edges 80 each defined by the intersection of a respective one of the first side faces 76 with the front face 72, and a pair of second cutting edges 82 each defined by the intersection of a respective one of the second side faces 78 with the front face 72. Each main cutting edge 80 is comprised of a central cutting edge portion 80a, a leading end portion 80b defined by the marginal ridge of the leading portion 76b, and a trailing end portion 80c defined by the marginal ridge of the trailing portion 76c. A marginal surface portion 84 of the front face 72 disposed adjacent to each second cutting edge 82 and the leading and trailing end portions 80b and 80c intersecting the second cutting edge 82 is defined by a part of a cylindrical surface. As shown in FIGS. 21 and 24, the cylinder defining the cylindrical surface is such that it has a radius $R_1$ and an axis M extending parallel to the second cutting edge 82 and the rear face 74 and contained in the rear face 74 although the axis M may not necessarily be contained in the rear face. With this construction, the leading end portion 80b of the main cutting edge 80 assumes a shape of an arc having a radius $R_1$ as viewed in a direction along the axis M. As a result, since the arcuate marginal surface portion 84 intersects the planar leading portion 76b of the first side face 76 so as to be inclined with respect to each other, the leading end portion 80b of the main cutting edge 80 generally assumes a part of an ellipse or conic section when viewed along the planar trailing portion 76c as shown in FIG. 26. Besides, since the planar leading portion 76b of the first side face 76 is inclined with respect to the front face 72 so as to define an acute angle therebetween, the leading end portion 80b of the main cutting edge 80 also assumes a part of an ellipse or conic section when viewed in a plan.

Figure 27:
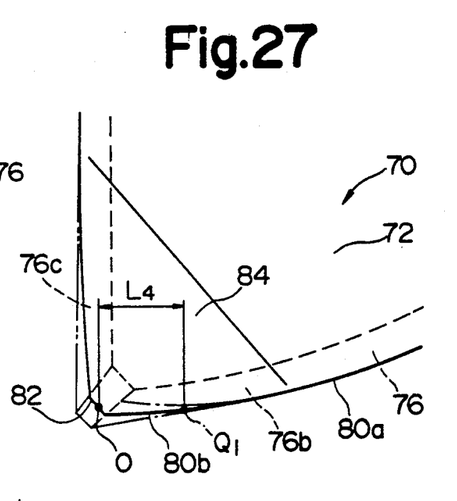
FIG. 27 is an enlarged view of a portion encircled by the character XXVII in FIG. 21.
Figure 28:
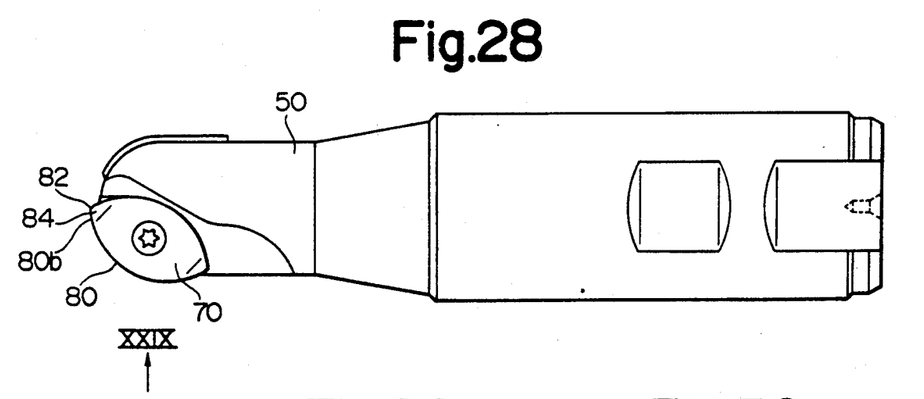
FIG. 28 is a front elevation of a ball end mill employing the insert of FIG. 21.
Figure 29:
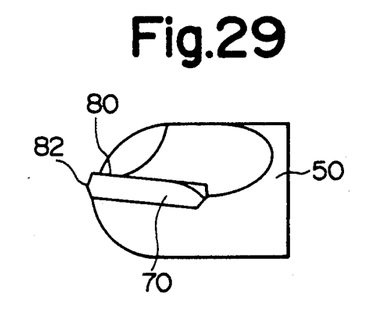
FIG. 29 is a side elevation of a part of the end mill of FIG. 28, as seen in the direction indicated by the arrow XXIX in FIG. 28.
Figure 30:
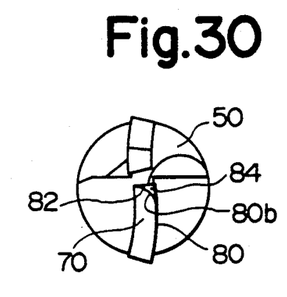
FIG. 30 is an end view of the end mill of FIG. 28.
Figure 31:
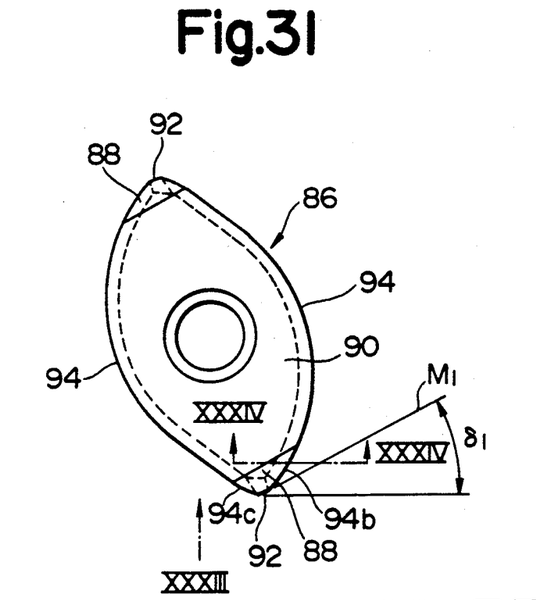
FIG. 31 is a plan view of a cutter insert in accordance with a sixth embodiment of the present invention.
Figure 32:
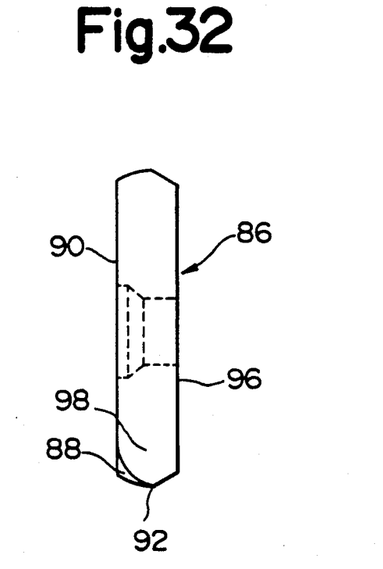
FIG. 32 is a side elevation of the cutter insert of FIG. 31.
Figure 33:
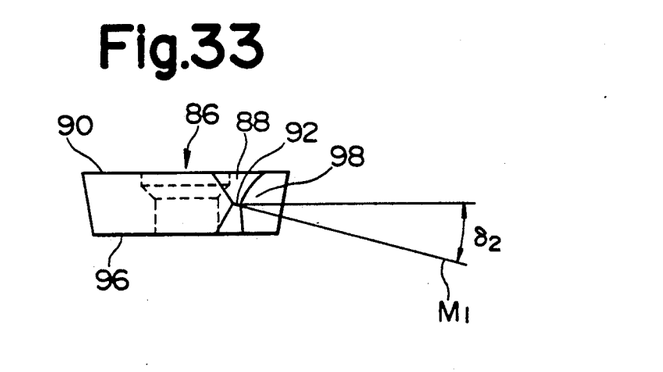
FIG. 33 is another side elevation of the insert of FIG. 31, as seen in the direction indicated by the arrow XXXIII in FIG. 31.

For manufacturing the above insert 70, there is prepared an insert blank which has no arcuate marginal surface portion formed in the front face yet. Such an insert blank has, as shown by the alternate long and two short dashes line in FIG. 27, an entirely flat front face, and hence those marginal ridge portions defined by the front face and the adjacent leading and trailing portions of the first side faces are straight. Subsequently, the marginal surface portion of the front face is processed into an arcuate shape, and thus a leading end portion assuming a part of an ellipse as viewed in a plan is formed on the main cutting edge. As shown in FIG. 27, the elliptically shaped leading end portion thus formed extends toward the second cutting edge 82 outwardly of an imaginary ideal arc which is extended from the arcuate central portion 80a of the main cutting edge 80 so as to have the same curvature as the arcuate portion 80a, the ideal arc being designated by the alternate long and short dash line in FIG. 27.

With the above construction, the insert 70 can form a hemispherically shaped recess in a workpiece with a higher accuracy. Specifically, in the prior art insert 100, since the cutting edge 114 assumes a shape of an arc when viewed in a plan, the contour generated by an arbitrary point Q on the leading end portion of the cutting edge 114 has a greater radius $L_1$ than the radius $L_2$ of the ideal arc, as shown in FIGS. 1 and 2. Therefore, the cross-sectional shape of the recess or groove processed by the leading end portion of the cutting edge 114 of the prior art insert 100 assumes an elliptical shape long from side to side. On the other hand, in the above insert 70, since the leading end portion 80b of the main cutting edge 80 assumes a part of an ellipse in an end view as shown in FIG. 26, the radius $L_3$ of a circular contour generated by an arbitrary point $Q_1$ on the leading end portion 80b approaches to the radius $L_4$ of the ideal arc as shown in FIG. 27. In addition, since the leading end portion 80b also assumes a part of an ellipse in a plan in such a manner that it extends outwardly of the ideal arc toward the second cutting edge 82. Accordingly, the contour generated by the leading end portion 80b of the main cutting edge 80 assumes a true hemispherical shape approximately, and hence the accuracy of the cutting can be increased substantially.

FIGS. 31 to 38 show a further modified cutter insert 86 in accordance with a sixth embodiment which is basically similar to the aforementioned inserts. In the insert 86, however, a marginal surface portion 88 of a front face 90 disposed adjacent to a second cutting edge 92 and the leading and trailing end portions 94b and 94c intersecting the second cutting edge 92 is defined by such a cylindrical surface with a radius $R_2$ that it slopes toward a rear face 96 as it approaches both of the second cutting edge 92 and the leading end portion 94b of a main cutting edge 94. More specifically, the marginal surface portion 88 is defined by a part of the surface of a cylinder having an axis parallel to a reference line designated by $M_1$ in FIGS. 31 and 33. The line $M_1$ is, as viewed in a direction perpendicular to the front face 90, inclined with respect to a line extended from the second cutting edge 92 at an angle $\delta_1$, and is, as viewed in a side elevation of the insert, inclined with respect to a line parallel to the front face at an angle $\delta_2$.

Figure 34:
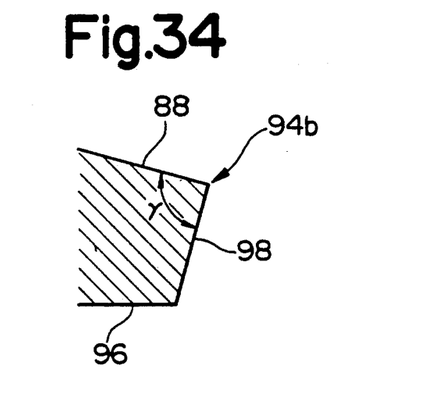
FIG. 34 is a cross sectional view taken along the line XXXIV—XXXIV in FIG. 31.
Figure 35:
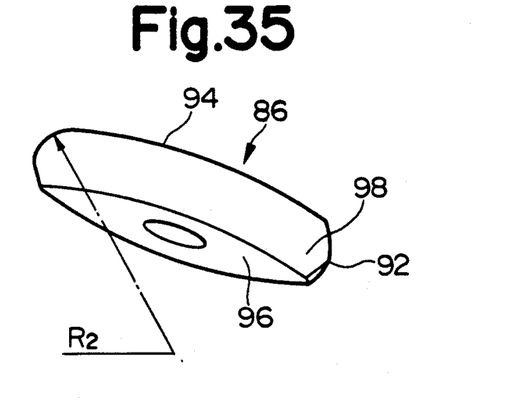
FIG. 35 is a perspective view of the insert of FIG. 31 as seen in a direction of a reference line.
Figure 36:
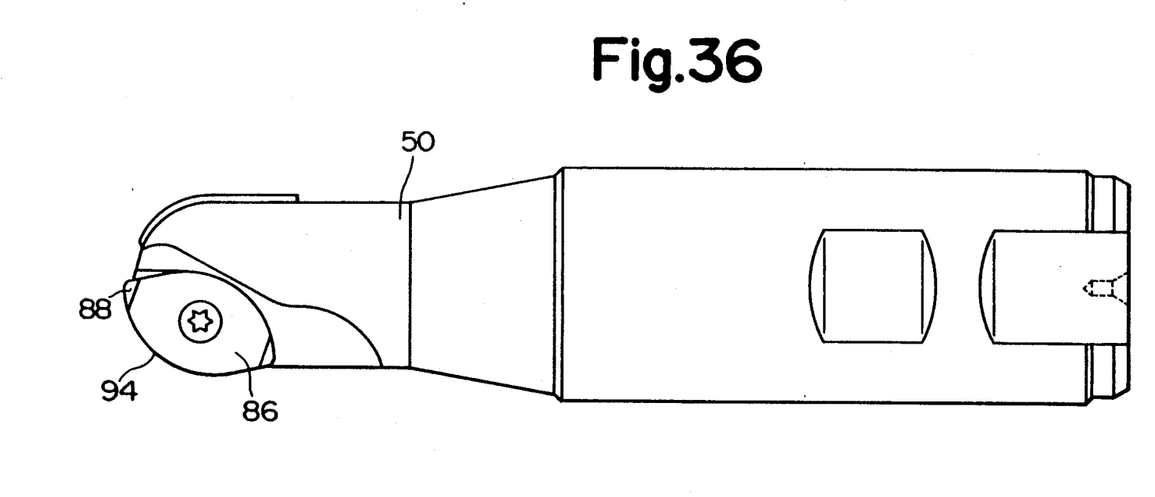
FIG. 36 is a ball end mill employing the insert of FIG. 31.
Figure 37:
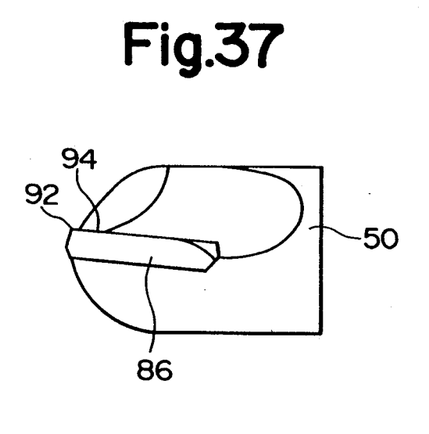
FIG. 37 is a side elevation of a part of the end mill of FIG. 36.
Figure 38:
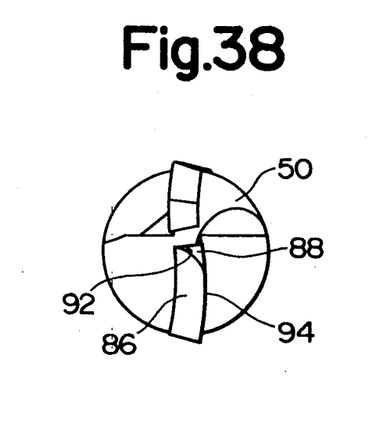
FIG. 38 is an end view of the end mill of FIG. 36.

With this construction, as best shown in FIG. 34, the included angle $\gamma$ of the leading end portion 94b of the main cutting edge 94, defined by the convexly curved marginal surface portion 88 and the leading portion of a first side face 98, is generally 90° or even greater than 90°. Therefore, the main cutting edge 94 has a further improved strength at its leading end portion 94b as compared with the aforementioned embodiments.

Figure 39:
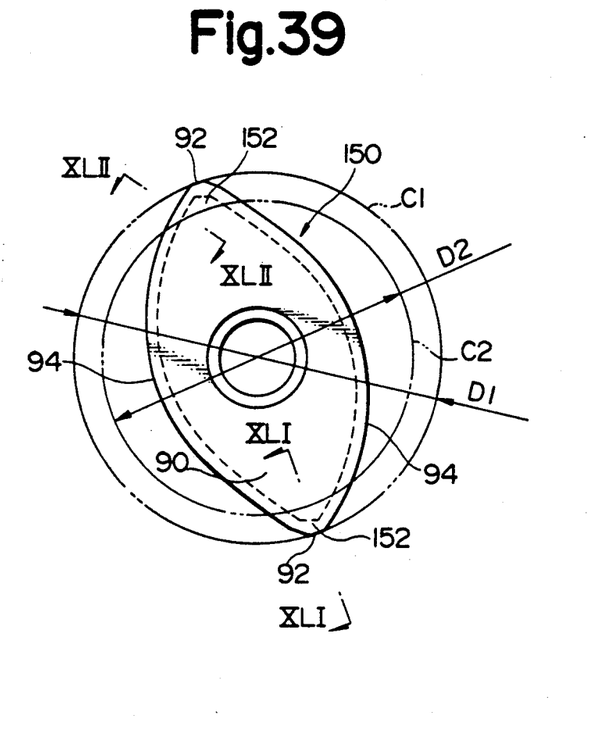
FIG. 39/ is a plan view of a cutter insert in accordance with a seventh embodiment of the present invention.
Figure 40:
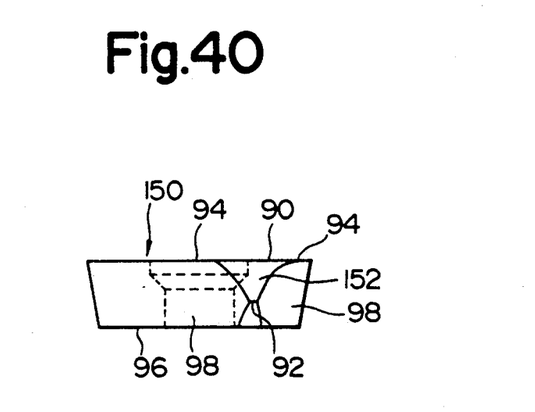
FIG. 40 is a side elevation of the cutter insert of FIG. 39.
Figure 41:
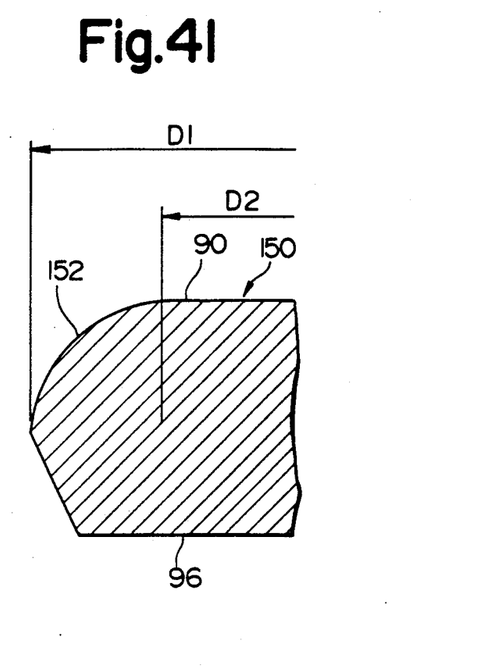
FIG. 41 is a cross sectional view of the insert of FIG. 39 taken along the line XLI—XLI in FIG. 39.
Figure 42:
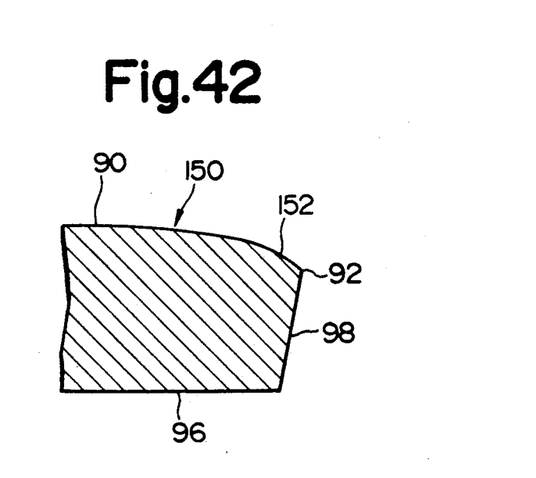
FIG. 42 is a cross sectional view of the insert of FIG. 39 taken along the line XLII—XLII in FIG. 39.

FIGS. 39 to 42 show a further modified cutter insert 150 in accordance with a seventh embodiment which differs from the sixth embodiment in that a marginal surface portion 152 of the front face 90 is defined by a part of a spherical surface. More specifically, as shown in FIG. 39, suppose a sphere having a diameter $D_1$ defined by the distance between the pair of second cutting edges 92, and a circle disposed coaxially with the sphere and having a smaller diameter $D_2$ than the sphere. The marginal surface portion 152 of this embodiment is then defined by an annular surface portion of the sphere sandwiched between a circumference $C_1$ of the sphere containing the second cutting edges 92 and a circumference $C_2$ of the circle. The marginal surface portion 152 of such construction can be formed more easily than those in the aforementioned embodiments. Further, although not shown in the drawings, the spherical surface may be replaced by a surface defining a part of an ellipsoid.

Obviously many other modifications and variations of the present invention are possible in the light of the above teachings. It is therefore to be understood that within the scope of the appended claims, the invention may be practiced otherwise than as specifically described.

What is claimed is:

1. An indexable cutter insert for a ball end mill comprising a plate of a generally elongated elliptical shape defined by a front face, a rear face, a pair of first side faces and a pair of second side faces lying between and disposed alternately about a periphery of said front and rear faces, each of said first side faces cooperating with said front face to define a main cutting edge which is generally arcuately shaped when viewed in a direction perpendicular to said front face, each of said second side faces cooperating with said front face to define a second cutting edge which is short and generally straight, each of said main cutting edges having a leading end portion which intersects a respective one of said second cutting edges at an obtuse angle, said front face serving as a rake surface for said main and second cutting edges and having a pair of marginal surface portions each disposed adjacent to a respective one of said second cutting edges, each of said marginal surface portions being convexly curved so as to slope toward said rear face and toward said respective second cutting edge, said leading end portion and at least that portion of said main cutting edge disposed adjacent to said leading end portion being formed to assume such a quadrantal shape when viewed in a direction perpendicular to said front face that, when the insert is disposed on the ball end mill with the leading end portion of the main cutting edge disposed adjacent to an axis of rotation of the ball end mill and with the second cutting edge extending from the leading end portion beyond the axis of rotation of the ball end mill when viewed in a direction generally perpendicular to said front face, the leading end portion of the cutting edge to be formed to assume such part of an elongate ellipse that a contour generated by the leading end portion during rotation of the rotary cutter defines an approximately true hemispherical shape.

2. An indexable cutter insert according to claim 1, in which each of said first side faces is inclined inwardly of the plate in a direction away from said front face, and is comprised in a central portion and a pair of leading and trailing portions disposed at opposite ends of said central portion, said leading portion being planar while said central portion is generally arcuately shaped when viewed in a direction perpendicular to said front face, each of said main cutting edges having a central cutting edge portion defined by said central portion of said first side face and said front face, said marginal surface portion being defined by a surface of a cylinder of a prescribed radius so that said leading end and central portions of said main cutting edge are of a substantially quandrantal shape when viewed in a direction perpendicular to said front face.

* * * * *